United States Patent [19]

Yamazaki

[11] Patent Number: 4,851,750
[45] Date of Patent: Jul. 25, 1989

[54] DECELERATION CONTROL FOR TRACER CONTROL EQUIPMENT

[75] Inventor: Etuo Yamazaki, Hachioji, Japan

[73] Assignee: Fanuc Ltd., Minamitsuru, Japan

[21] Appl. No.: 34,390

[22] PCT Filed: Jul. 21, 1986

[86] PCT No.: PCT/JP86/00384
§ 371 Date: Mar. 5, 1987
§ 102(e) Date: Mar. 5, 1987

[87] PCT Pub. No.: WO87/00476
PCT Pub. Date: Jan. 29, 1987

[30] Foreign Application Priority Data

Jul. 22, 1985 [JP] Japan ............................ 60-161598

[51] Int. Cl.[4] ............................................. G05B 13/04
[52] U.S. Cl. ...................................... 318/576; 318/561
[58] Field of Search .............. 318/561, 576, 578, 369

[56] References Cited

U.S. PATENT DOCUMENTS

| | | | |
|---|---|---|---|
| 3,991,354 | 11/1976 | Rosa et al. ......................... | 318/800 |
| 4,328,450 | 5/1982 | Gabor ................................ | 318/561 |
| 4,357,664 | 11/1982 | Imazeki et al. .................. | 318/578 X |
| 4,394,608 | 7/1983 | Tryber et al. .................... | 318/578 |
| 4,603,285 | 7/1986 | Matsuura ......................... | 318/578 |
| 4,638,230 | 1/1987 | Lee .................................... | 318/561 X |
| 4,646,225 | 2/1987 | Matsuura ......................... | 318/578 X |

FOREIGN PATENT DOCUMENTS 61-249119 11/1986 Japan ................................. 318/561

*Primary Examiner*—Bentsu Ro
*Attorney, Agent, or Firm*—Staas & Halsey

[57] ABSTRACT

In tracer control equipment which controls the relative feed rate between a tracer head (1) and a model by controlling a motor (12X to 12Z) according to a displacement signal ($\epsilon_x$ to $\epsilon_z$) from the tracer head, a deceleration control circuit (18) is provided to perform deceleration control corresponding to the configuration of the model at a jerk point thereof. The deceleration control circuit (18) compares a plurality of threshold values with variation of the displacement signal ($\epsilon_x$ to $\epsilon_z$) per unit time, and controls the relative feed rate between the tracer head and the model depending upon which region defined by the plurality of threshold values includes the amount of variation of the displacement signal.

6 Claims, 3 Drawing Sheets

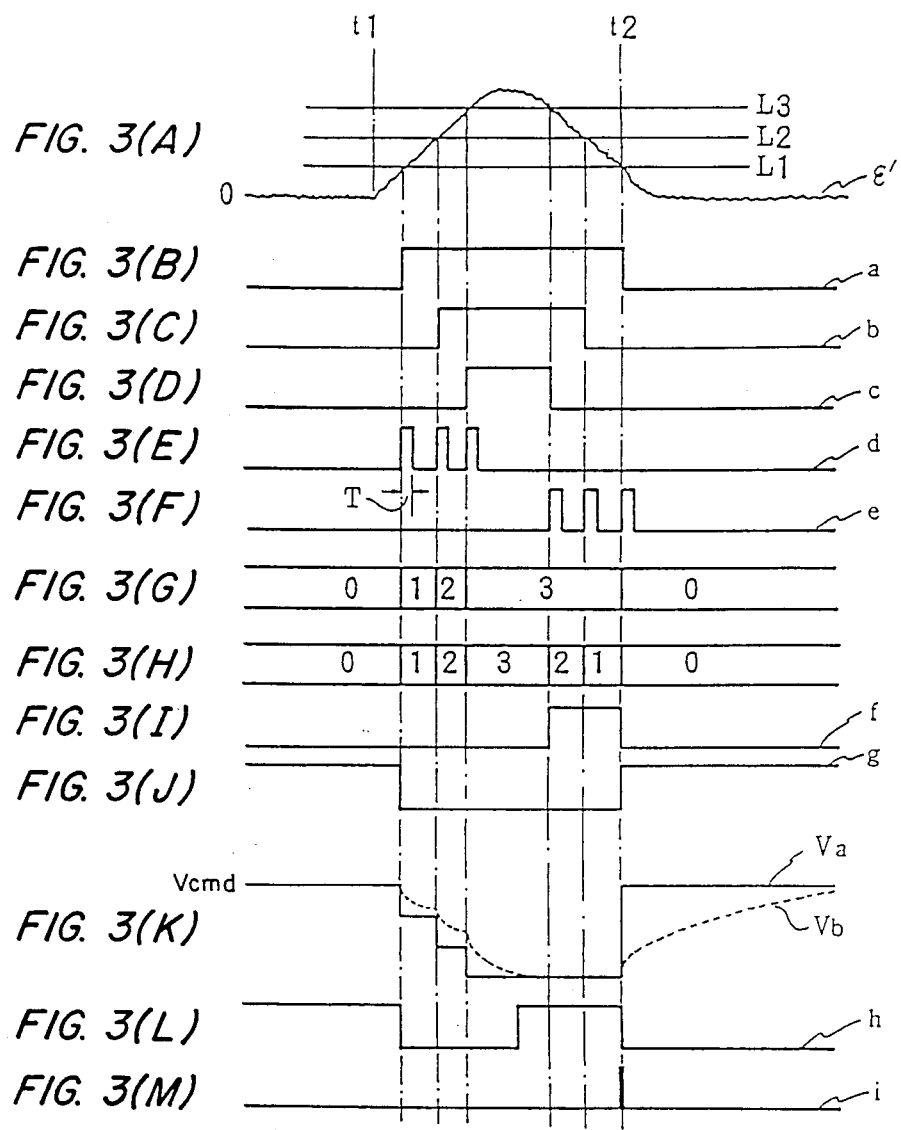
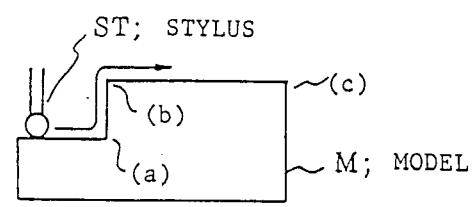
FIG. 4
PRIOR ART

DECELERATION CONTROL FOR TRACER CONTROL EQUIPMENT

BACKGROUND OF THE INVENTION

1. Field Of The Invention

The present invention relates to improvement in tracer control equipment, and more particularly to tracer control equipment which enables deterioration control at a jerk point in the configuration of a model to be optimum to the configuration of thereof at that particular point.

2. Description of the Related Art

In the case of tracing a model M with a configuration as shown in FIG. 4, if the jerk points (a) to (c) in the configuration of the model are traced at the same speed as that for flat surfaces of the model, a cutter can bite into a workpiece at the jerk point (a) and a stylus ST can move out of contact with the surface of the model M at the jerk points (b) and (c). To avoid this, it is a general practice in the prior art to compare the variation of a displacement signal from a tracer head per unit time with a preset value and reduce the feed rate to a predetermined value while the former is greater than the latter. That is, since the displacement signal from the tracer head undergoes an abrupt change at each jerk point in the configuration of the model and the variation of the displacement signal per unit time also varies abruptly at the jerk point, it is possible to prevent the biting of the cutter into the workpiece and other similar trouble by controlling the feed rate as mentioned above.

According to the above-mentioned prior art example, however, when the changing ratio of the displacement signal exceeds a predetermined value, the feed rate is reduced to a predetermined value regardless of the configuration of the model at the jerk point so that it is impossible to perform optimum deceleration control corresponding to the configuration of the model at the jerk point. Namely, according to the prior art example, the feed rate during deceleration must be set low so that the cutter will not bite into the workpiece even when the stylus traces a sharp corner of the model. Consequently, when deceleration control takes place at a gentle corner portion, the feed rate undergoes an abrupt change, which results in the problem of deterioration of the workpiece surface.

SUMMARY OF THE INVENTION

The present invention has as an object enabling optimum deceleration control corresponding to the configuration of the model at a jerk point therein.

To solve the above-noted problem, the tracer control equipment of the present invention, which controls the relative feed rate between the model and the tracer head tracing the surface thereof, in accordance with the displacement signal from the latter, is provided with detecting means for detecting the variation of the displacement signal per unit time, decision means for comparing the detected variation of the displacement signal with a plurality of threshold values of different levels and deciding which of regions defined by the threshold values the variation of the displacement signal belongs to, and deceleration control means whereby the relative feed rate between the tracer head and the model is reduced to and held at a value corresponding to the result of the decision by the decision means during a period from the time when the variation of the displacement signal is decided by the decision means to have exceeded the threshold value of the lowest level of the other threshold values to the time when it is decided to have returned to a value smaller than the threshold value of the lowest level.

According to the tracer control equipment of the present invention, since the feed rate for deceleration control is determined depending upon which of the regions defined by the plurality of threshold values the variation of the displacement signal per unit time belongs to, optimum deceleration control can be achieved corresponding to the configuration of the model at the jerk point. Furthermore, since the deceleration control means continues its deceleration control until the variation of the displacement signal becomes smaller than the threshold value of the lowest level again after having exceeded it, deceleration and its removal will not be repeated.

BRIEF DESCRIPTION OF THE DRAWINGS

FIGS. 3(A)-3(M) form a timing diagram for explaining the operation of the circuit shown in FIG. 2; and FIG. 4 is a diagram for explaining a defect of a prior art example.

DESCRIPTION OF THE PREFERRED EMBODIMENT

Figure 1:
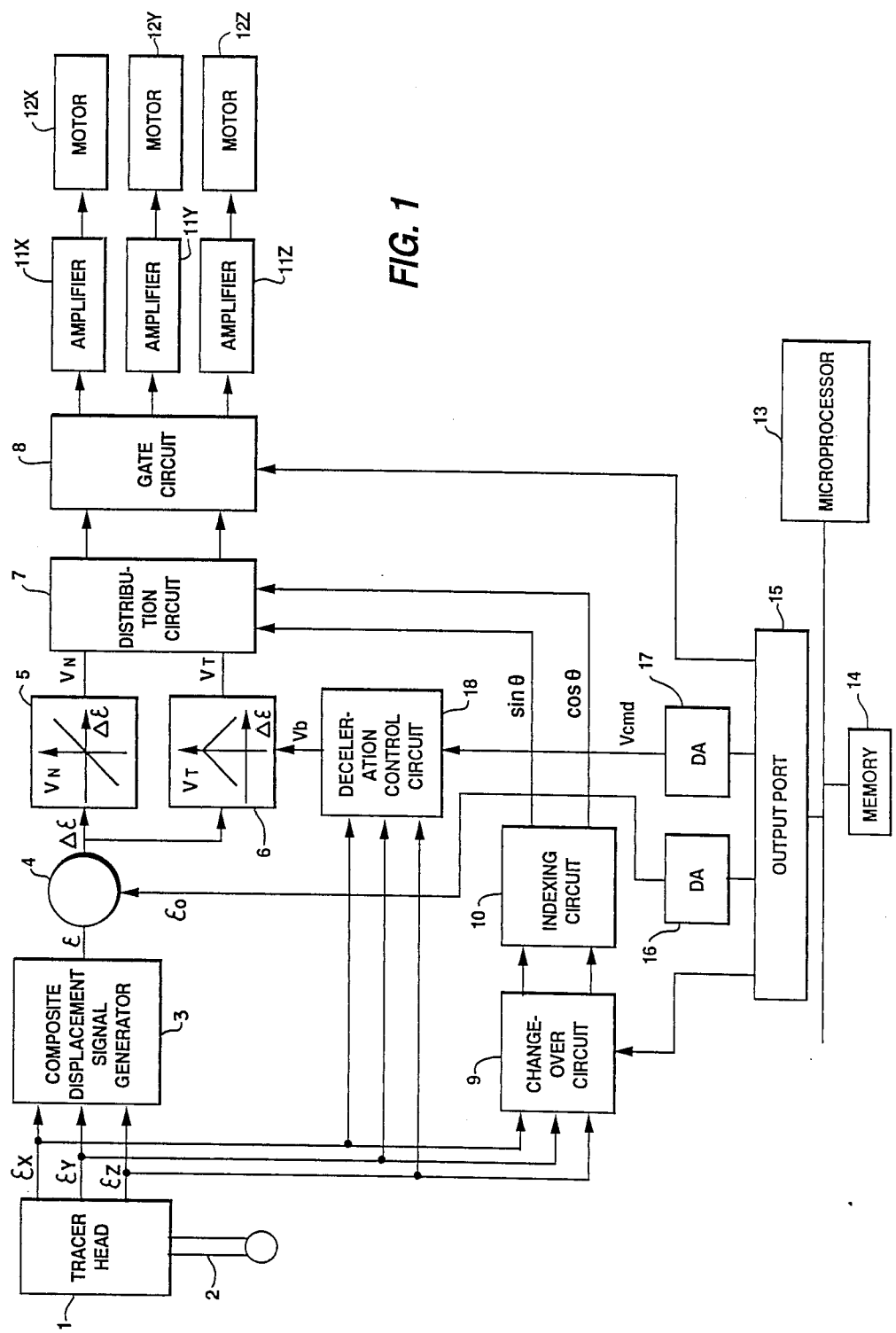
FIG. 1 is a block diagram of an embodiment of the present invention.

FIG. 1 illustrates in block form an embodiment of the present invention. Reference numeral 1 indicates a tracer head, 2 a stylus, 3 a composite displacement signal generator, 4 an adder, 5 and 6 velocity calculation circuits, 7 a distribution circuit, 8 a gate circuit, 9 a change-over circuit, 10 an indexing circuit, 11X, 11Y and 11Z amplifiers in the X, Y and Z axes, 12X, 12Y and 12Z motors in the X, Y and Z axes, 13 a microprocessor, 14 a memory, 15 an output port, 16 and 17 DA converters, and 18 a deceleration control circuit.

The tracer head 1 outputs displacement signals $\epsilon_x$, $\epsilon_y$ and $\epsilon_z$ corresponding to the displacement of the stylus 2 in the X-, Y- and Z-axis directions which moves in contact with a model. The displacement signals $\epsilon_x$, $\epsilon_y$ and $\epsilon_z$ are provided to the composite displacement signal generator 3, the changeover circuit 9, and the deceleration control circuit 18. The composite displacement signal generator 3 yields a composite displacement signal, $\epsilon = \sqrt{\epsilon_x^2 + \epsilon_y^2 + \epsilon_z^2}$, which is applied to the adder 4. The adder 4 obtains a difference, $\Delta\epsilon = \epsilon - \epsilon_0$, between the composite displacement signal $\epsilon$ and a reference displacement signal $\epsilon_O$ which is provided via the output port 15 and the DA converter 16. The difference $\Delta\epsilon$ thus obtained is applied to the velocity calculation circuits 5 and 6. Based on the difference $\Delta\epsilon$, the velocity calculation circuits 5 and 6 obtain a normal-direction velocity signal $V_N$ and a tangential-direction velocity signal $V_T$, which are provided to the distribution circuit 7. The change-over circuit 9 supplies the indexing circuit 10 with that one of the displacement signals $\epsilon_x$, $\epsilon_y$ and $\epsilon_z$ from the tracer head 1 which corresponds to the axis constituting the plane being traced. The indexing circuit 10 produces displacement-direction signals $\sin\theta$ and $\cos\theta$ on the basis of the displacement signals which are applied via the change-over circuit 9. Incidentally, when the plane of tracing is the X-Z plane, the X- and Z-axis displacement signals $\epsilon_x$ and $\epsilon_z$ are provided via the change-over circuit 9 to the indexing circuit 10.

The distribution circuit 7 generates a velocity command signal, based on the normal-direction and tangential-direction velocity signals $V_N$ and $V_T$ from the velocity calculation circuits 5 and 6 and the displacement-direction signals $\sin\theta$ and $\cos\theta$ from the indexing circuit 10. The velocity command signal is applied to the amplifier selected by the gate circuit 8, and the resulting amplified output drives the corresponding motor, feeding the tracer head 1 and the model relative to each other. Since the above-described operation is well-known as tracer control, no further detailed description thereof will be given.

Figure 2:
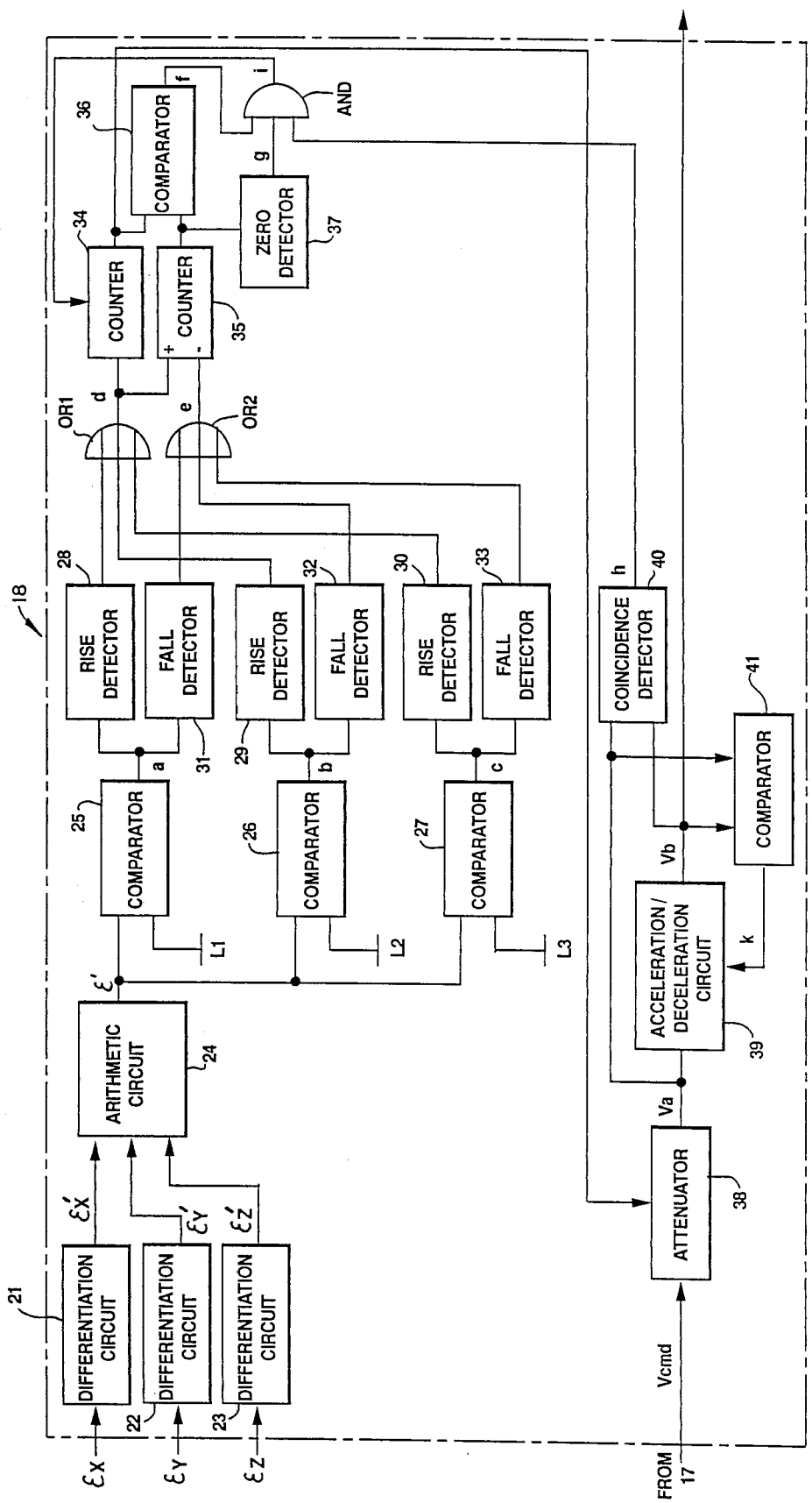
FIG. 2 is a block diagram illustrating an example of the arrangement of a deceleration control circuit 18.

FIG. 2 illustrates in block form an example of the arrangement of the deceleration control circuit 18 which controls the feed rate in accordance with the configuration of the model. Reference numerals 21 to 23 designate differentiation circuits, 24 an arithmetic circuit, 25 to 27 comparators, 28 to 30 rise detectors, 31 to 33 fall detectors, 34 and 35 counters, 36 a comparator, 37 a zero detector, 38 an attenuator, 39 an acceleration/deceleration circuit, 40 a coincidence detector, 41 a comparator, OR1 and OR2 OR gates, and AND an AND gate.

The differentiation circuits 21 to 23 in the deceleration control circuit 18 differentiate the displacement signals $\epsilon_x$, $\epsilon_y$ and $\epsilon_z$ which are applied thereto from the tracer head 1, the differentiated outputs being provided to the arithmetic circuit 24. The arithmetic circuit 24 produces a signal, $\epsilon' = \sqrt{\epsilon_x'^2 + \epsilon_y'^2 + \epsilon_z'^2}$, based on the output signals $\epsilon_x'$, $\epsilon_y'$ and $\epsilon_z'$ from the differentiation circuits 21 to 23. The comparators 25 to 27 compare the output signal $\epsilon'$ from the arithmetic circuit 24 with predetermined threshold values L1, L2 and L3 (where L1 < L2 < L3), respectively, and make their output signals a, b and c "1s" while the output signal $\epsilon'$ from the arithmetic circuit 24 is greater than the threshold values. The rise detectors 28 to 30 make their output signals "1s" for only a predetermined period of time T at the rise of the output signals a to c from the comparators 25 to 27, respectivley. The fall detectors 31 to 33 make their output signals "1s" for only the predetermined period of time T at the fall of the output signals a to c from the comparators 25 to 27, respectively.

The counter 34 increments its count value CA by one each time the output signal d of the OR gate OR1 which ORs the output signals from the rise detectors 28 to 30 goes to a "1", and it is reset when the output signal i of the AND gate AND goes to a "1"; namely, its count value CA is made a "0". The counter 35 increments its count value CB by one each time the output signal d of the OR gate OR1 which is applied to its + terminal goes to a "1", and it decrements its count value CB by one each time the output signal e of the OR gate OR2 which is applied to its − terminal goes to a "1". The comparator 36 compares the count values CA and CB of the counters 34 and 35 and makes its output signal f a "1" when the condition CA > CB is satisfied. The zero detector 37 makes its output signal g a "1" when the count value CB of the counter 35 is a "0".

The attenuator 38 attenuates a velocity command signal Vcmd which is provided thereto via the DA converter 17 from the microprocessor 13, with an attenuation factor corresponding to the count value CA of the counter 34 (which attenuation factor is zero when the count value is a "0", and increases as the count value CA increases). The acceleration/deceleration circuit 39 operates as a filter with a time constant $\tau_1$ when the output signal k of the comparator 41 is a "1" and, as a filter with a time constant $\tau_2$ (where $\tau_2 \gg \tau_1$) when the output signal k is a "0", the output signal Vb being applied to the velocity calculation circuit 6. The comparator 41 compares the output signal Va of the attenuator 38 and the output signal Vb of the acceleration/deceleration circuit 39 and makes its output signal k a "1" while Vb > Va. Accordingly, the acceleration/deceleration circuit 39 operates as the filter with the time constant $\tau_1$ during deceleration and as the filter with the time constant $\tau_2$ during tracing at the normal feed rate. The coincidence detector 40 makes its output signal h a "1" when detecting coincidence between the output signal Va of the attenuator 38 and the output signal Vb of the acceleration/deceleration circuit 39. The velocity calculation circuit 6 varies its input/output characteristic in accordance with the level of the output signal Vb from the acceleration/deceleration circuit 39 in such a manner that the lower the level of the signal Vb becomes, the more the output level (the tangential-direction velocity signal $V_T$) for the same input level is lowered.

Accordingly, assuming that the stylus has reached a jerk point in the configuration of the model, for example, at a time t1, the output signal $\epsilon'$ of the arithmetic circuit 24 abruptly rises in level at the time t1, as shown in FIG. 3(A). In response to this, the output signals a to c of the comparators 25 to 27 go to "1s" in succession, as depicted in FIGS. 3(B) to (D), with the result that the output signal d of the OR gate OR1 which ORs the output signals of the rise detectors 28 to 30 goes to a "1" at the rise of each of the signals a to c, as shown in FIG. 3(E).

As the output signal d of the OR gate OR1 undergoes such variations as depicted in FIG. 3(E), the count values CA and CB of the counters 34 and 35 are gradually incremented in the order "0", "1", ..., as shown in FIGS. 3(G) and (H), respectively. The increase in the count value CA of the counter 34 increases the attenuation factor of the attenuator 38, and consequently its output signal Va diminishes stepwise, as indicated by the solid line in FIG. 3(K). At the same time, the output signal Vb of the acceleration/deceleration circuit 39 also gradually diminishes from the level Vcmd, with the time constant $\tau_1$, as indicated by the broken line in FIG. 3(K).

As a result of this, the level of the tangential-direction velocity signal $V_T$, which is provided from the velocity calculation circuit 6, drops in proportion to the decrease in the level of the output signal Vb of the acceleration/deceleration circuit 39, thus decreasing the feed rate.

Then, when the output signal $\epsilon'$ of the arithmetic circuit 24 diminishes, the output signals c, b and a of the comparators 27, 26 and 25 go to "0"s in succession, as depicted in FIGS. 3(D), (C) and (B), respectively. In consequence, the output signal e of the OR gate OR2, which ORs the output signals of the fall detectors 31 to 33, goes to a "1" at the rise of each of the signals c to a, as shown in FIG. 3(F). As the output signal e of the OR gate OR2 varies, as shown in FIG. 3(F), the count value CB of the counter 35 gradually decreases, as depicted in FIG. 3(H). When the count value CB has reached "2", the output f of the comparator 36 goes to a "1", as depicted in FIG. 3(I), and when the count value CB has reached "0" (at a time t2), the output signal g of the zero detector 37 goes to a "1", as shown in FIG. 3(J).

When the output signal g of the zero detector 37 has thus risen to the "1" level at the time t2, the output signal i of the AND gate AND, by which are ANDed the output signal f of the comparator 36, the output signal g of the zero detector 37, and the output signal h of the coincidence detector 40, shown in FIGS. 3(I), (J) and (L), respectively, goes to a "1", as depicted in FIG. 3(M). The output signal i resets the counter 34 to make its count value CA a "0", in consequence of which the attenuation factor of the attenuator 38 is reduced to zero and its output signal Va assumes the level Vcmd, as indicated by the solid line in FIG. 3(K). Furthermore, the increase in the level of the output signal Va of the attenuator 38 causes an increase in the level of the output signal Vb of the acceleration/deceleration circuit 39, as indicated by the broken line in FIG. 3(K). In this case, however, since Va>Vb and the output signal k of the comparator 41 remains at the "0" level, the signal Vb gradually increases with the time constant $\tau_2$.

Then, as the level of the output signal Vb of the acceleration/deceleration circuit 39 rises, the level of the tangential-direction velocity signal $V_T$ from the velocity calculation circuit 6 rises, ceasing deceleration control.

As described above, according to this embodiment, since the output signal $\epsilon'$ of the arithmetic circuit 24 is compared with the plurality of threshold values L1 to L3 (where L1<L2<L3) and the feed rate is reduced to a value corresponding to the level of the signal $\epsilon'$, it is possible to perform optimum deceleration control corresponding to the configuration of the model at a jerk point therein. Moreover, once the signal $\epsilon'$ exceeds the threshold value L1, the deceleration control is continued until the signal $\epsilon'$ returns to the threshold value L1, and consequently deceleration and its removal will not be repeated during deceleration control.

While in the above embodiment the threshold values are described to be three, i.e. L1 to L3, they are not limited specifically thereto as long as they are plural.

As described above, the present invention is provided with detecting means (which comprises the differention circuits 21 to 23 and the arithmetic circuit 24 in the embodiment) for detecting the variation of a displacement signal from the tracer head per unit time, decision means (which comprises the comparators 25 to 27 in the embodiment) for comparing the detected variation of the displacement signal and a plurality of threshold values of different levels and deciding which of regions defined by the threshold values the detected variation of the displacement signal belongs to, and a deceleration control circuit (which comprises the rise and fall detectors 28 to 33, the OR gates OR1 and OR2, the counters 34 and 35, the comparator 36, the zero detector 37, the AND gate AND, and the attenuator 38) whereby the relative feed rate between the tracer head and a model is reduced to and held at a value corresponding to the result of decision by the decision means during a period from the time when the variation of the displacement signal is decided by the decision means to have exceeded the threshold value of a level lower than those of the other threshold values to the time when it is decided to have returned to a value smaller than the threshold value of the lowest level. Since the feed rate during deceleration can be changed in accordance with the variation of the displacement signal per unit time, that is, according to the configuration of the model at a jerk point therein, the present invention possesses the advantage that optimum deceleration control can be effected in accordance with the configuration of the model at the jerk point. Furthermore, since the deceleration control means continues deceleration control over the entire period from the time when the variation of the displacement signal exceeds the threshold value of a level lower than those of the other threshold values to the time when it returns to a value smaller than the threshold value of the lowest level, the present invention has another advantage that deceleration and its removal will not be repeated during deceleration control.

What is claimed is:

1. Tracer control equipment controlling a relative feed rate, between a model and a tracer head tracing the surface of the model, in accordance with a displacement signal output by the tracer head, said tracer control equipment comprising:

detecting means for detecting variation of the displacement signal over time;

decision means for comparing a plurality of threshold values of different levels with the detected variation of the displacement signal and for determining a region, defined by the threshold values, including the detected variation of the displacement signal; and deceleration control means for reducing without increasing the relative feed rate between the tracer head and the model to a value corresponding to the region determined by said decision means during a period from a first time when the variation of the displacement signal is determined by the decision means to have exceeded the threshold value of the lowest level of the threshold values to a second time when the detected variation of the displacement signal is determined to be smaller than the threshold value of the lowest level.

2. Tracer control equipment as recited in claim 1, wherein said detecting means comprises means for supplying a first derivative of the displacement signal as the detected variation of the displacement signal.

3. Tracer control equipment as recited in claim 1, wherein said deceleration control means comprises:

region changing detection means for detecting when the region determined by said decision means changes; and speed control means for controlling the relative feed rate between the tracer head and the model in dependence upon changes in the region detected by said region changing detection means.

4. Tracer control equipment controlling a relative feed rate between a model and a tracer head tracing the surface of the model, in accordance with a displacement signal output by the tracer head, said tracer control equipment comprising:

detecting means for detecting variation of the displacement signal over time;

decision means for comparing a plurality of threshold values of different levels with the detected variation of the displacement signal and for determining a region, defined by the threshold values, including the detected variation of the displacement signal; and deceleration control means for reducing the relative feed rate between the tracer head and the model to a value corresponding to the region determined by said decision means during a period from a first time, when the variation of the displacement signal is determined by the decision means to have exceeded the threshold value of the lowest level of the threshold value, to a second time, when the detected variation of the displacement signal is determined to be smaller than the threshold value of the lowest level, said deceleration control means including rise and fall detectors, operatively connected to said decision means, each rise and fall detector respectively detecting when the variation of the displacement signal first exceeds and first returns below a corresponding threshold value; and speed control means for controlling the relative feed rate between the tracer head and the model in dependence upon changes in the region identified by said rise and fall detectors.

5. Tracer control equipment as recited in claim 4, wherein said speed control means comprises counting means for producing a count indicating the highest threshold value exceeded for each time the lowest threshold value is exceeded;

reset means for resetting said counting means when the variation of the displacement signal returns below the lowest threshold value; and attenuation means for reducing the relative feed rate in dependence upon the count produced by said counting means.

6. A method for deceleration control in a tracer control system using a tracer head to trace a surface of a model at a relative feed rate and to produce a displacement signal, said method comprising the steps of:

(a) detecting variation of the displacement signal over time;

(b) comparing the variation of the displacement signal with a plurality of threshold levels having different values to determine a region, defined by two of the threshold values, including the variation of the displacement signal;

(c) reducing the relative feed rate of the tracer head in dependence upon the region determined in step (b); and (d) maintaining the relative feed rate in dependence upon the region defined by the highest threshold level exceeded by the variation of the displacement signal, for each occurrence of the variation of the displacement signal exceeding the lowest threshold level, until the variation of the displacement signal returns below the lowest threshold level.

* * * * *